United States Patent
Siebers et al.

(10) Patent No.: US 7,823,437 B2
(45) Date of Patent: Nov. 2, 2010

(54) ANEMOMETER CALIBRATION METHOD AND WIND TURBINE

(75) Inventors: Thomas Siebers, Neuenkirchen (DE); Henk-Jan Kooijman, Enschede (NL); Donald Rogers, Greer, SC (US)

(73) Assignee: General Electric Company, Schenectady, NY (US)

(*) Notice: Subject to any disclaimer, the term of this patent is extended or adjusted under 35 U.S.C. 154(b) by 633 days.

(21) Appl. No.: 11/764,641

(22) Filed: Jun. 18, 2007

(65) Prior Publication Data
US 2008/0307853 A1 Dec. 18, 2008

(51) Int. Cl.
*G01P 21/00* (2006.01)
(52) U.S. Cl. ........................................................ 73/1.37
(58) Field of Classification Search ................ None
See application file for complete search history.

(56) References Cited

U.S. PATENT DOCUMENTS 3,541,855 A * 11/1970 Frenzen et al. ............ 73/861.85
6,320,272 B1 * 11/2001 Lading et al. ................. 290/44
6,895,812 B2 * 5/2005 Dahlberg .................. 73/170.01
2005/0145007 A1 * 7/2005 Wible ........................ 73/1.34

* cited by examiner

*Primary Examiner*—Robert R Raevis
(74) *Attorney, Agent, or Firm*—Global Patent Operation; Douglas D. Zhang

(57) ABSTRACT

A method for re-calibrating an anemometer of a wind turbine is provided, the method comprising the steps of obtaining pairs of measured values of wind speed and a wind-speed dependent turbine variable; comparing said measured value pairs to pairs of wind speed and the turbine variable obtained from an expected turbine variable curve of the wind turbine to determine a difference between a measured wind speed value and an expected wind speed value for a given turbine variable value; and adjusting a calibration function of said anemometer on the basis of said determined difference.

20 Claims, 7 Drawing Sheets

ANEMOMETER CALIBRATION METHOD AND WIND TURBINE

BACKGROUND OF THE INVENTION

The present invention relates to a method for calibrating an anemometer, in particular for in situ calibration of an anemometer In the field of wind energy, anemometers are typically used to measure the wind speed at a specific wind turbine site since wind speed is an important control parameter for the operation of wind turbines. Typically, a wind turbine is equipped with at least one anemometer mounted on the nacelle. However, the readings of such a nacelle anemometer are often inaccurate. One reason for the inaccuracy is that conventional anemometers are not individually calibrated. Instead, the same linear average calibration function is typically used for all sensors and turbines of the same type, which does not account for variation in ambient conditions, site conditions, or site specific turbine parameter settings.

BRIEF DESCRIPTION OF THE INVENTION

In view of the above, the present invention provides a method for re-calibrating an anemometer of a wind turbine. The method comprises the steps of obtaining pairs of measured values of wind speed and a wind speed-dependent turbine variable; comparing said measured value pairs to pairs of wind speed and the turbine variable obtained from an expected turbine variable curve of the wind turbine to determine a difference between a measured wind speed value and an expected wind speed value for a given turbine variable value; and adjusting a calibration function of said anemometer on the basis of said determined difference.

Further aspects, advantages and features of the present invention are apparent from the dependent claims, the description and the accompanying drawings.

According to an aspect of the invention, an in situ calibration method for an anemometer of a wind turbine comprises the steps of measuring wind speed and power; performing regression analysis using measured wind speed as a dependent variable and measured power as an independent variable; performing the same regression analysis to a theoretical power curve using wind speed as a dependent variable and power as an independent variable; calculating a difference between measured wind speed and theoretical wind speed from the regression parameters; and adjusting the calibration function of the anemometer by means of the calculated difference so that the adjusted measured wind speed values fit with the theoretical wind speed values.

According to a further aspect of the present invention, a wind turbine comprises an anemometer for measuring wind speed values, a sensor for determining a a wind-speed dependent turbine variable of the wind turbine, and a controller, the controller being adapted to obtain pairs of measured values of wind speed and the turbine variable; compare said measured value pairs to pairs of wind speed and the turbine variable obtained from an expected turbine variable curve of the wind turbine to determine a difference between a measured wind speed value and an expected wind speed value for a given turbine variable value; and adjust a calibration function of said anemometer on the basis of said determined difference.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

In the following, embodiments of the present invention will be described in which generated output power is used as a wind speed-dependent turbine variable. However, it will be understood by those skilled in the art that the inventive method described below can similarly be applied to any other turbine variable that depends on the wind speed. In this context, it should be understood that the term "wind speed-dependent" should include that the variable is influenced by the wind speed either directly or indirectly but is not necessarily solely dependent on wind speed. Accordingly, in the following description the reference to generator output power should be understood as a placeholder for any of the other turbine variables applicable in the methods according to embodiments of the present invention. In addition to generator output power, also rotational speed of the wind rotor, rotational speed of the generator rotor, torque, pitch angle, bending of the rotor blades, tower vibrations, blade vibrations, nacelle vibrations, vibrations of the drive train, and noise emissions from the wind turbine may be used as wind speed-dependent turbine variables. Moreover, it might be advantageous to combine two or more of the afore-mentioned variables to obtain more accurate results for the anemometer calibration curve. Of course, respective sensors will be provided at the wind turbine to measure the wind speed-dependent turbine variables.

Figure 1:
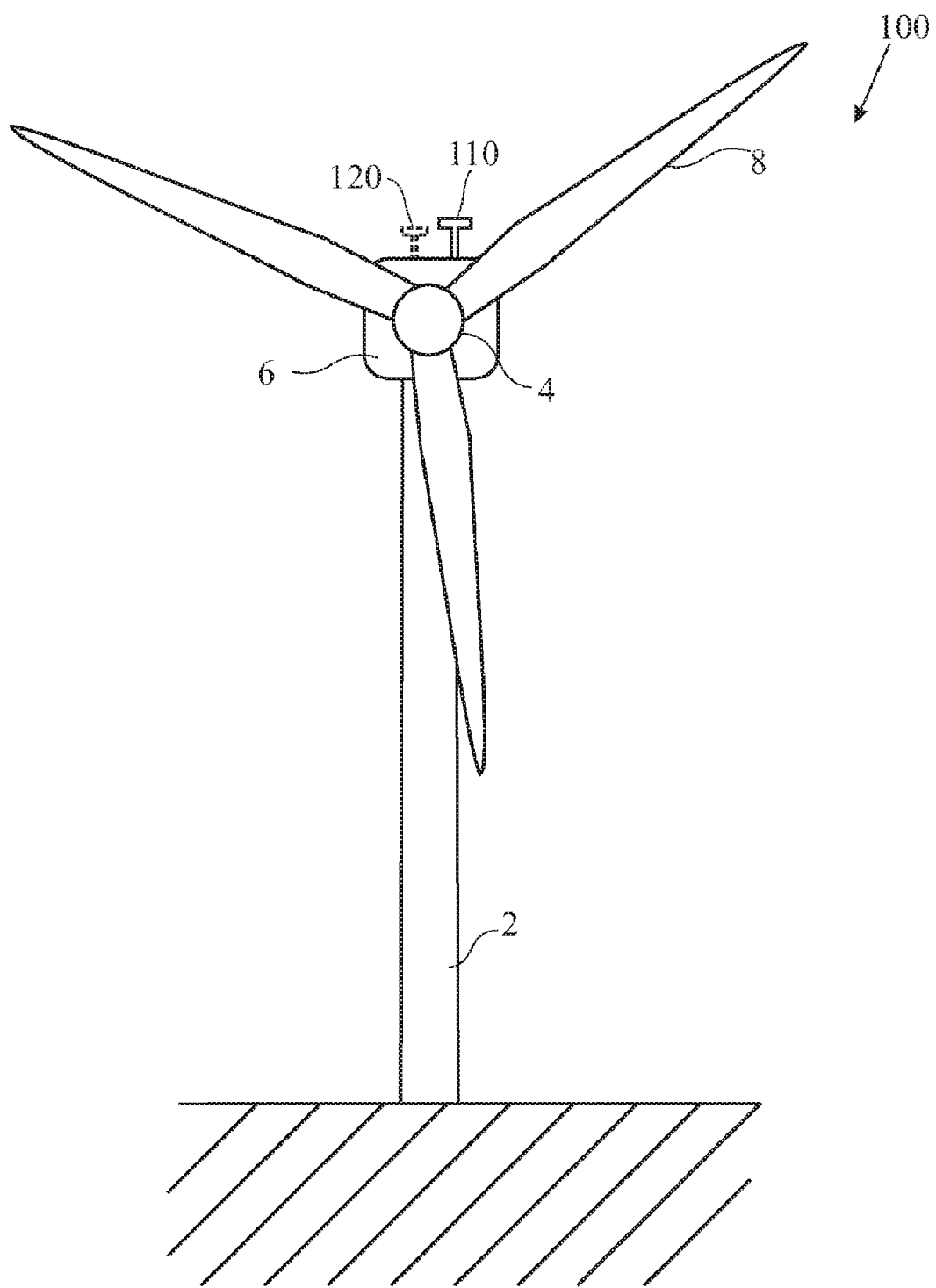
FIG. 1 shows a schematic drawing illustrating a wind turbine including an anemometer according to embodiments described herein.

FIG. 1 shows a schematic drawing illustrating a wind turbine 100 including an anemometer 110 according to an exemplary embodiment of the present invention. The wind turbine 100 includes a tower 2 on top of which a nacelle 6 is mounted.

A wind rotor 4 equipped with three rotor blades 8 is rotatably mounted to nacelle 6. Of course, the embodiments of the present invention may also be applied to wind turbines with one, two, or other numbers of rotor blades. Kinetic energy is captured from the wind by rotor blades 8 and urges rotor 4 to rotate about its rotation axis. Rotor 4 is coupled to an electric generator (not shown) via a rotor shaft (not shown). Rotor 4 may be coupled to the generator either directly or via a gear box. Driven by rotor 4, the electric generator generates electric power which can then be fed to a utility grid or the like. Furthermore, wind turbine 100 has a sensor (not shown) for measuring the electric power output of the electric generator. Thus, measured values of the generator power can be provided by the sensor. Furthermore, the wind turbine 100 includes an anemometer 110 for measuring the actual wind speed at the turbine site. Typically, anemometer 110 is mounted on top of nacelle 6 downstream of wind rotor 4. According to some embodiments, a second anemometer 120 (shown in broken lines) or even further anemometers may be provided. Thus, redundant wind speed measurements may be performed to increase accuracy and/or identify defective anemometers.

In some embodiments of the present invention, the wind turbine further includes a controller (not shown) which is coupled to the anemometer 110 and the power sensor. Thus, the controller can obtain measured values of wind speed and power which are used in calibration methods according to embodiments of the present invention described below. In some embodiments, the controller is adapted to perform the in situ anemometer calibration methods according to embodiments of the present invention. For this purpose, the controller typically includes a memory for storing measured values and other data and a processor for performing arithmetic manipulations.

According to an equivalent alternative embodiment of the present invention, the measured wind speed and power values are transmitted to a remote turbine control site. In this case, the data may be transmitted by any suitable means including wire-bound and wire-less communication, and also transmission via the internet. In this embodiment, the calculations for an anemometer calibration method according to embodiments of the present invention are performed at the remote control site and the final result is transmitted back to the wind turbine. There, the anemometer calibration function is updated based on the results received from the remote control site.

According to a further equivalent alternative embodiment of the present invention, the measured values of wind speed and power are stored in a memory (not shown) which may be provided in the wind turbine. The memory may have a data port through which maintenance staff may access the memory and download the stored wind speed and power data. The maintenance staff may have a laptop, tablet PC or similar device on which a software program is installed that executes at least part of the calibration method according to an embodiment of the present invention. A corrected calibration function obtained by such method may be then uploaded to the turbine so that the anemometer is recalibrated.

Figure 2:
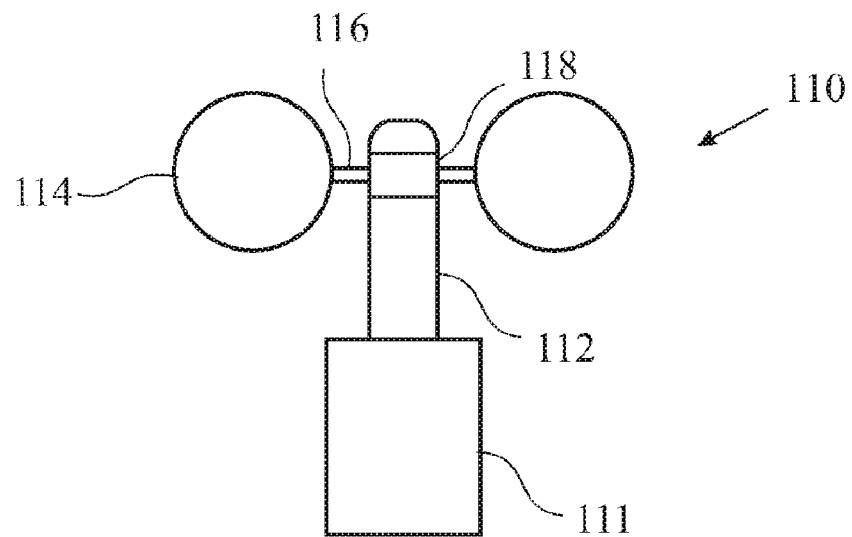
FIG. 2 shows a schematic drawing illustrating an anemometer used for embodiments described herein.

FIG. 2 shows a schematic drawing illustrating an anemometer used for embodiments described herein. The anemometer 110 shown in FIG. 2 is a so-called cup anemometer. On the main body 111, an axis or shaft 112 is provided. Cups 114 are mounted to the arms 116, which are rotatably fixed to the axis or shaft by a ring 118. The ring 118 can rotate around the axis or shaft 112. According to one embodiment, the axis or shaft 112 and/or the ring 118 can be heated with a power of, e.g., 15 to 20 W. Thereby, influence of icing on the anemometer is reduced. According to another embodiment the anemometer 110 is not heated. Generally, the embodiments of a cup anemometer include three cups. However, according to other embodiments cup anemometers with four cups may also be utilized. It should be understood by those skilled in the art that the cup anemometer 110 is only an exemplary embodiment and other types of anemometers may also be utilized in the present invention. For example, sonic anemometers may also be used. In sonic anemometers, arms include sonic transceivers (or a transmitter and a receiver, respectively) which are distant to each other to provide a measurement section. The velocity of propagation of sound between the arms is superimposed with the wind speed. Thus, wind speed influences the speed of sound propagation. A measurement of the delay of the propagation can thus be applied to determine the wind speed.

Figure 3:
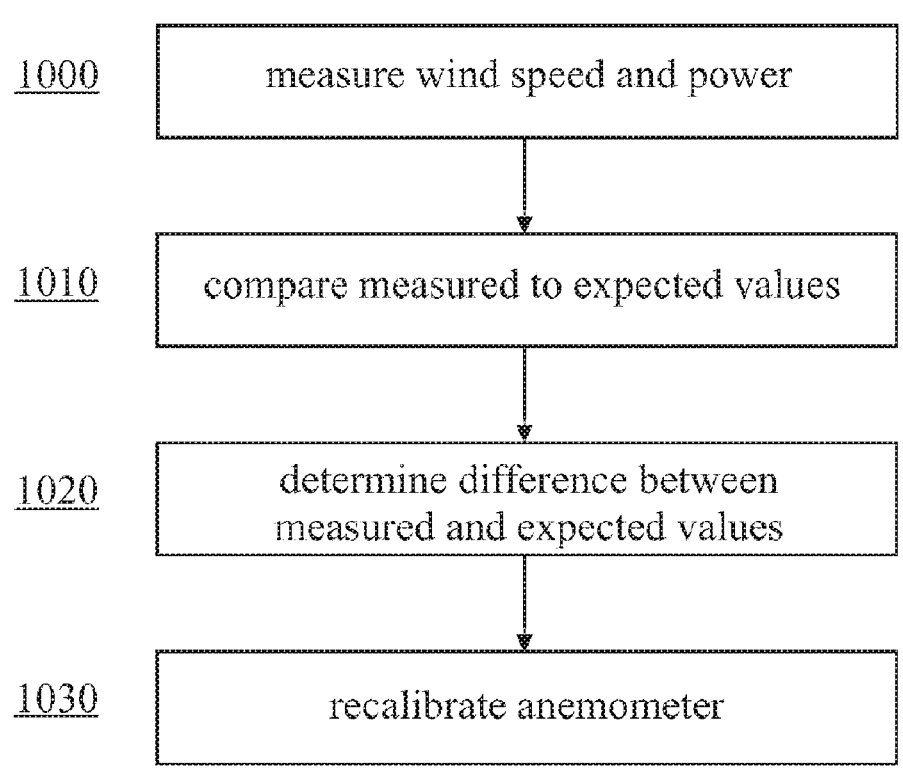
FIG. 3 is a flow diagram of a calibration method according to embodiments described herein.

FIG. 3 is a flow diagram of a recalibration method according to embodiments described herein. In a first step 1000 of the method, pairs of measured values of wind speed and generated power are obtained. For example, the anemometer and the power sensor provide their respective measurement values to a controller of the wind turbine. Typically, the measurement values are already time-averaged values. Typical averaging times are 30 seconds and more, e.g. 1 minute, 5 minutes or even longer like 10 minutes. Due to the time-averaging of the measurement, the intermittent behavior of wind speed and the resulting fluctuating power output is smoothed to some degree. When selecting the time period over which the measurements are averaged, one should consider the available resolution of an expected power curve for the wind turbine. In particular, it is advantageous if the time average of the measurements and the time resolution of the expected curve, e.g. a simulated power curve, are equal or at least similar. Thus, artifacts due to different time bases can be avoided. According to some embodiments, not every measured value is taken into consideration but the value pairs (wind speed, power) are selected from a substantially linear range of the expected power curve of said wind turbine. For example, such a linear range may be found between one third to two thirds of the nominal power of the wind turbine. In some cases, this range might be expanded and lie between 400 kW to 1,100 kW for a 1,500 kW turbine. On the other hand, a more or less linear relation between wind speed and power can be found for wind speeds ranging between 7 m/s and 10 m/s. Within the above specified linear range, the power curve is relatively insensitive to changes in the boundary conditions like ambient turbulence. Therefore, measurement data selected from the linear range of the power curve are advantageously applied in calibration methods according to embodiments of the present invention.

In a next step 1010, the measured values are compared to values obtained from an expected power curve of the wind turbine. The purpose of such comparison is to determine a difference between measured wind speed values and expected wind speed values for a given power value. If such differences exist, they indicate that the anemometer is not correctly calibrated since it overrates or underrates the actual wind speeds.

Figure 6:
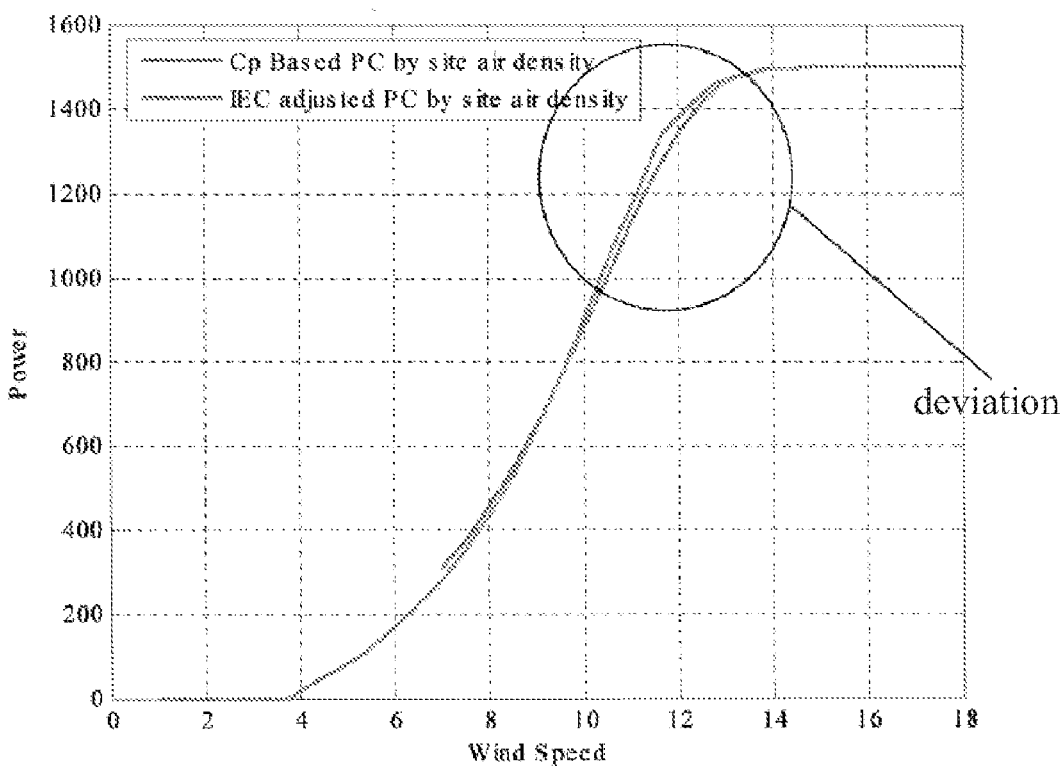
FIG. 6 shows an expected power curve used in a calibration method according to embodiments described herein.

FIG. 6 shows such an expected power curve as it is used in a calibration method according to embodiments described herein. Therein, the basically S-shaped power curve exhibits a linear behavior in a wind speed range between 9 m/s and 11 m/s or, inversely, in a power range from 450 kW to about 1,200 kW. The full power curve shown in FIG. 6 is obtained from theoretical calculations and/or simulations. However, FIG. 6 shows also a second partial curve which deviates from the full curve in a range between 10 m/s and 12 m/s. This second curve is a correction for local air density at the turbine site, e.g. because the site is at an elevated altitude or due to air temperature changes. Such correction may either be implemented by a standard IEC method or by a dynamical feedback process. Such a dynamical adaptation of the expected power curve is described in co-pending application U.S. Ser. No. 11/567,264 filed by the same applicant on Dec. 6, 2006, the complete disclosure of which is hereby incorporated by reference. Thus, the expected power curve may be purely based on theoretical and numerical computation, or may have been dynamically adapted to the specific site conditions. Furthermore, in some embodiments the complete expected power curve is provided e.g. as a mathematical function or as a set of data values. In other embodiments, only a part of the power curve, e.g. a linear portion thereof is provided. In still other embodiments, only regression parameters fitting the power curve according to a specific regression method, e.g. linear regression, are provided to define at least a portion of the power curve.

When comparing the measured values to the expected power curve, it is assumed that the expected power curve is closely met during the calibration period, e.g. immediately after commissioning of the turbine, so that the measured power values can be identified with the expected power values. Thus, any deviation of the measured values from the expected power curve can be attributed to a mismatch between measured wind speed and expected wind speed. Accordingly, the differences between the measured and expected values are determined in a next step 1020. In this context, it should be understood that also the measured wind speed values have to be adjusted to the air density during measurement so that air density can be excluded as a reason for differing measured and expected values.

After the differences between the measured values and the expected power curve have been determined, the identified differences are used to adjust the calibration function, or calibration curve, of the anemometer accordingly in step 1030. In other words, the calibration curve of the anemometer is modified to compensate for the identified differences between measured and expected wind speeds. Thus, the recalibrated anemometer will provide more accurate measurement data in future measurements. Such correct wind speed data are required for any kind of analysis of the turbine operation and the like. Furthermore, the in situ calibration method eliminates the need for cost intensive wind tunnel calibration of individual anemometers.

Figure 4:
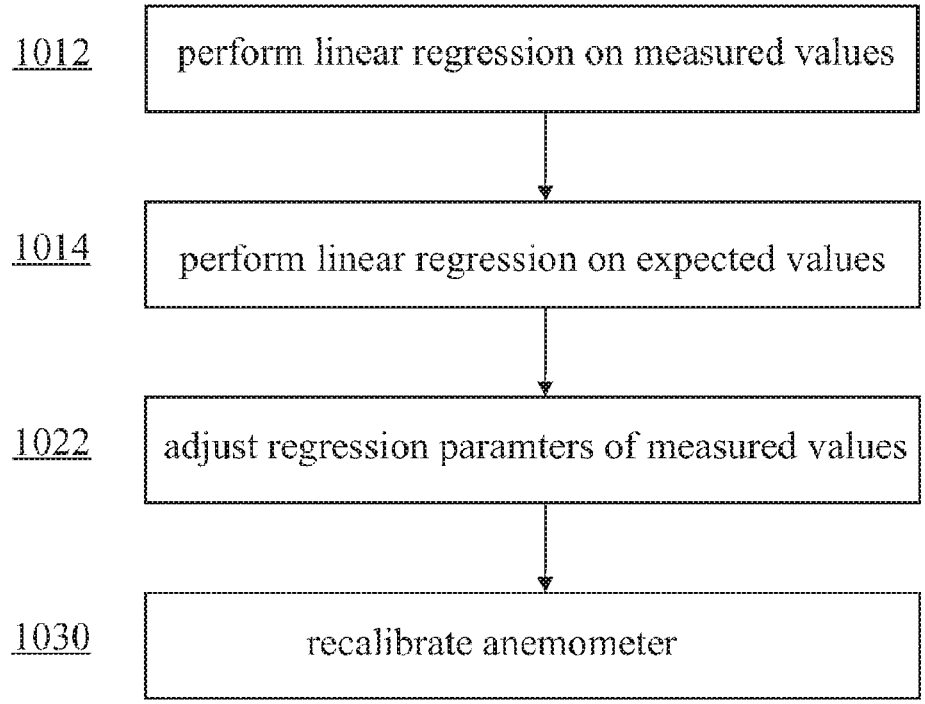
FIG. 4 is a more detailed flow diagram of a part of the calibration method displayed in FIG. 3.

FIG. 4 is a more detailed flow diagram of a part of the calibration method displayed in FIG. 3. Therein, an embodiment of how the comparison between the measured and expected values can be carried out is explained. In a first substep 1012, a linear regression analysis is performed on the measured values. In this linear regression analysis, measured power is used as the independent variable or regressor while wind speed is used as the dependent variable or regressand. Sometimes, the independent variable is also called a predictor and the dependent variable is called a response variable. Thus, measured wind speed $v_{meas}$ is obtained as a function of power P in the form $v_{meas} = a_{meas} + b_{meas} \cdot P$. Likewise, a linear regression is performed in substep 1014 on the expected power curve which is related to the real actual wind speed by $v_{real} = a_{PC} + b_{PC} \cdot P$. In a next substep 1022, the differences between the regression parameters $a_{meas}$ and $b_{meas}$ of the measured values and the regression parameters $a_{PC}$ and $b_{PC}$ of the measured values can be used to adjust or correct the calibration curve of the anemometer. Thus, the recalibrated anemometer will signal the correct actual wind speeds. In the above-described case of linear regression, the corrected linear calibration curve of the anemometer is obtained by $$(v_{real} =) v_{corr} = a_{PC} - \frac{b_{PC}}{b_{meas}} \cdot a_{meas} + \frac{b_{PC}}{b_{meas}} \cdot v_{meas}$$

Although the above embodiment relates to a linear regression analysis, it should be understood that also nonlinear regression analysis is within the scope of the present invention. However, anemometers typically exhibit a linear behavior so that linear regression is most suitably adapted for the purpose of the present invention. Furthermore, linear regression can be performed with considerably lower effort compared to nonlinear regression. Of course, nonlinear regression may be utilized especially for anemometers exhibiting nonlinear behavior.

Figure 5:
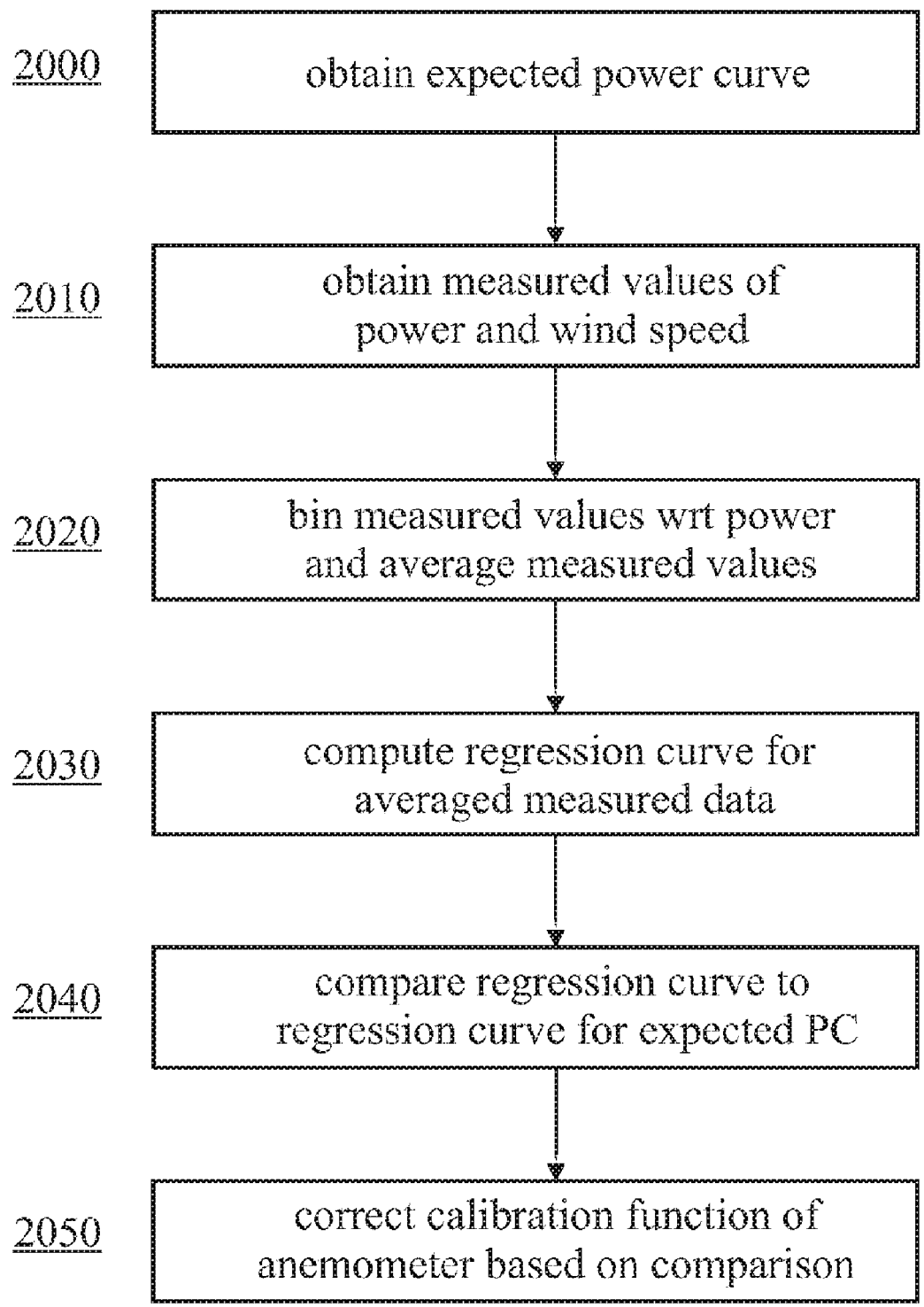
FIG. 5 is a flow diagram of a calibration method according to another embodiment described herein.

FIG. 5 is a flow diagram of a calibration method according to another embodiment described herein. Therein, an expected power curve of the wind turbine is obtained in a first step 2000. The expected power curve may be based on theoretical considerations and numerical simulations only but may also be derived from IEC power curve measurements or a combination of both. Furthermore, it should be understood that the expected power curve may be provided in the form of a mathematical function, numerical data points, or regression parameters of a fitting curve. Furthermore, the expected power curve may be provided over the complete power and wind speed range or only in a selected part thereof. Also, it is not necessary that the power curve is instantaneously created or generated at the turbine site but may be stored in a memory of the wind turbine prior to commissioning the turbine to a customer.

In another step 2010, values of wind speed and output power are measured by respective sensors. In particular, wind speed is measured by an anemometer mounted at the wind turbine. As explained above, the measured values are typically time-averaged over measurement times of 30 seconds or more for smoothing irregular fluctuations. Of course, the same time average is typically applied for both variables, wind speed and output power. Thus, value pairs of wind speed and power corresponding to the same measurement interval can be formed. According to some embodiments, the value pairs (wind speed, power) are selected from a specific portion of the operational range only, e.g. a substantially linear range of the expected power curve of said wind turbine. For example, such a linear range may be found between one third to two thirds of the nominal power of the wind turbine. In some cases, this range might be expanded and lie between 400 kW to 1,100 kW for a 1,500 kW turbine. On the other hand, a more or less linear relation between wind speed and power can be found for wind speeds ranging between 6 m/s and 12 m/s for some wind turbine types. Within the above specified linear range, the power curve is relatively insensitive to changes in the boundary conditions like ambient turbulence. Therefore, measurement data selected from the linear range of the power curve are advantageously applied in calibration methods according to embodiments of the present invention.

In a subsequent step 2020, the measured wind speed values are binned with respect to power. For example, the power range is subdivided into N bins and the wind speed values are binned with respect to the N power bins. Then, the wind speed values within each bin are averaged, respectively. Thus, N averaged pairs of wind speed and power values are obtained. In this context, it is advantageous if the number M of wind speed values in each bin is at least equal to the numbers of power bins N, i.e. M≧N. Thus, the statistical confidence of the averaged values is significant. Of course, each bin should contain a sufficient minimum number of measured values, e.g. about ten, so that the standard deviation of the averaged values is reasonably small to obtain meaningful results from the analysis. Also, a reasonable number of power bins should be defined. In particular, it typically makes no sense to have only two power bins, i.e. two averaged values, to define the regression line for the wind speed curve.

After averaging the measured values, a regression analysis is performed on the averaged values in step 2030. Thus, a regression curve defined by the obtained regression parameters is obtained for the measured values. In this regression analysis, power is used as an independent variable and wind speed is used as a dependent variable so that wind speed is obtained as a function of power. As explained above, any type of regression analysis including nonlinear regression analysis may be applied. However, linear regression is typically selected since most standard anemometers exhibit linear behavior.

In another step 2040, the regression curve obtained for the measured values is compared with a regression curve obtained from the expected power curve. Also in the regression analysis for the expected power curve, power is used as an independent variable and wind speed is used as a dependent variable so that wind speed is obtained as a function of power. Typically, the same type of regression analysis is performed on the measured values and the expected power curve. Thus, the results of both regression analyses can be readily compared with one another.

In a next step 2040, the regression curves for the measured and expected values are compared with one another to identify differences therebetween. For example, in a linear regression analysis the offset parameter a and the slope parameter b of the measured and expected regression curves can be compared with one another.

If a difference in the regression parameters is detected, this difference can be used to correct the calibration curve of the anemometer in step 2050. For the example of linear regression analysis, the calibration curve may offset and/or inclined to match the expected regression curve. The mathematical expression for such a correction has already been given above. Thus, the anemometer is recalibrated so that its future measurement values match the real actual wind speeds.

Next, an exemplary embodiment of a calibration method will be described with reference to FIGS. 7 to 10.

Figure 7:
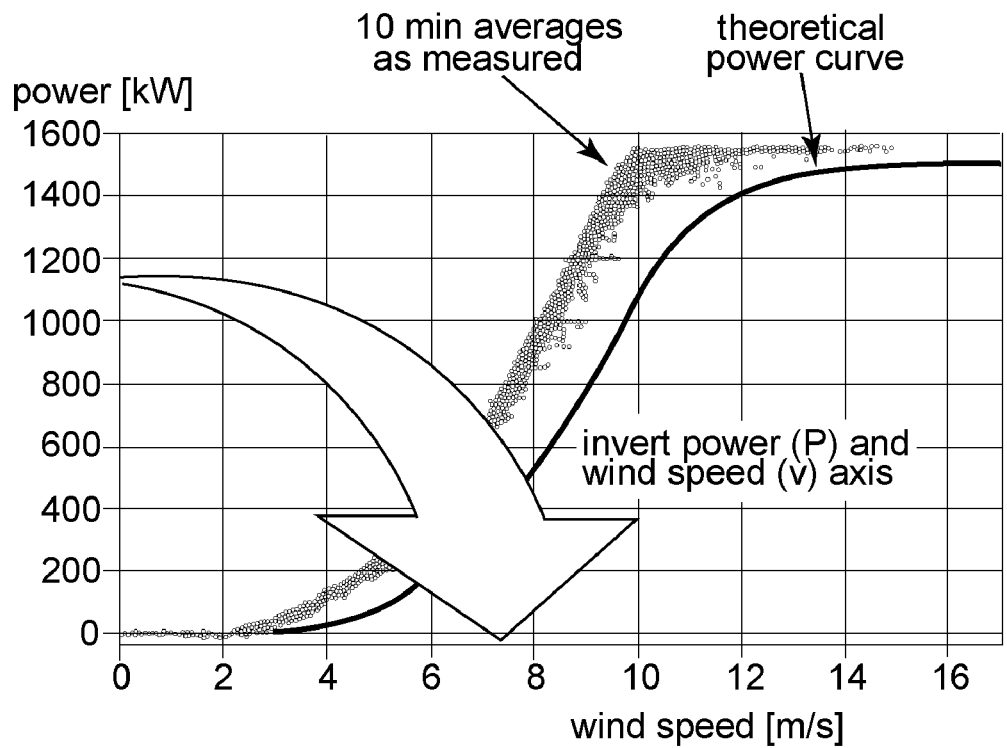
FIG. 7 shows a theoretical (expected) power curve together with measured values of wind speed and output power.

FIG. 7 shows a theoretical power curve together with measured values of wind speed and output power. The measured values are based on time-averaged measurements averaged over 10 minutes for each data point. Apparently, the measured data roughly follow the shape of the expected (theoretical) power curve but are clearly offset to lower wind speeds. As described above, the power and wind speed axes are inverted to obtain wind speed as a function of power.

Figure 8:
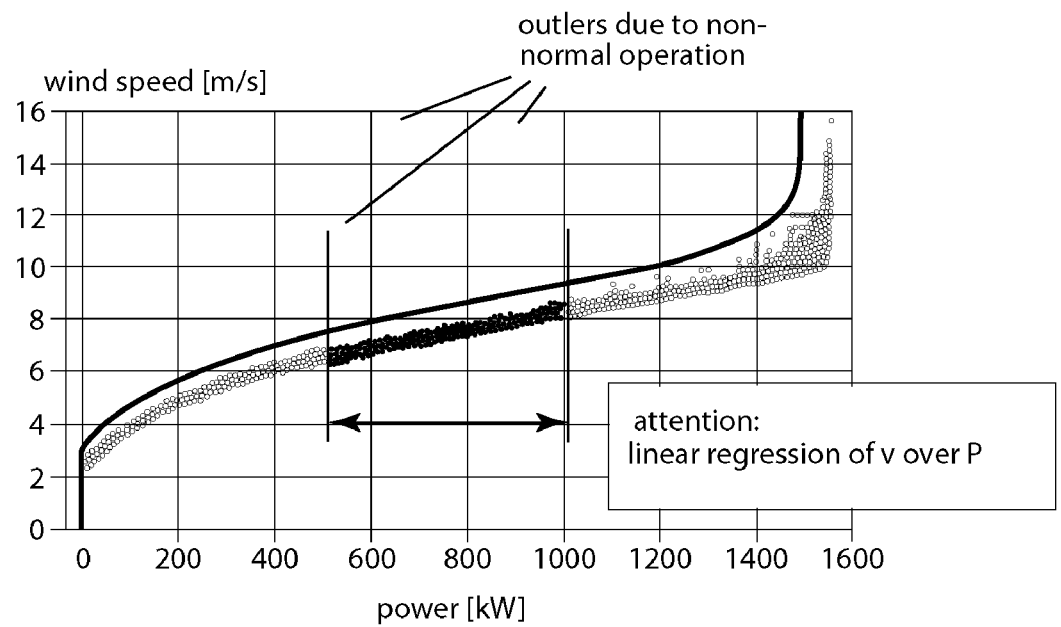
FIG. 8 shows an example of a linear regression analysis used in embodiments described herein.

FIG. 8 shows an example of a linear regression analysis used in embodiments described herein. This linear regression is based on the inverted power curve that has been obtained as explained with reference to FIG. 7. Furthermore, a specific power range between 500 kW and about 1,000 kW is selected for regression analysis since the inverted power curve exhibits almost linear behavior in this range. Furthermore, outliers corresponding to non-normal operation of the wind turbine are cut off and not considered in the linear regression analysis.

Figure 9:
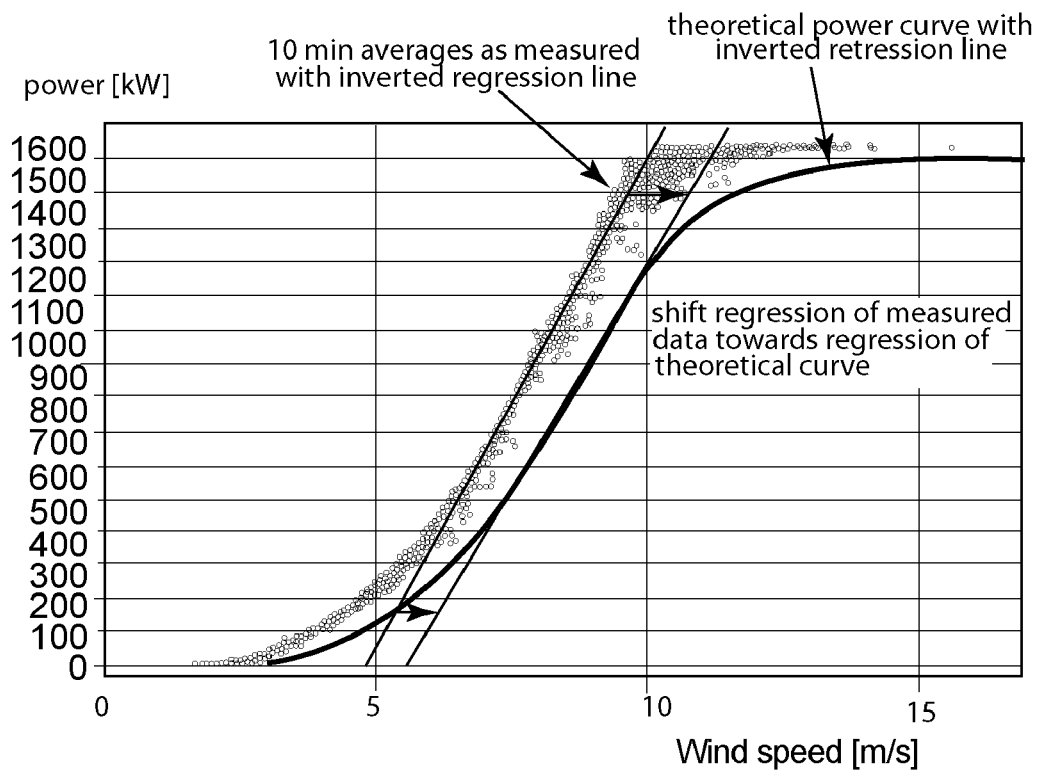
FIG. 9 shows a correction step according to embodiments described herein.

FIG. 9 shows a correction step according to embodiments described herein. Therein, the linear regression curves for both the measured values and the expected power curve are shown. Since the linear regression was performed for wind speed over power, both regression curves have been inverted to fit with the normal power curve plot showing power over wind speed. Apparently, the regression curve for the measured values is not only offset from the expected curve but also skewed. The skew can be observed by comparing the distance between both regression curves for zero power and nominal power, i.e. 1,500 kW. To correct the data, the regression curve for the measured values is shifted to match the regression curve for the expected values.

Figure 10:
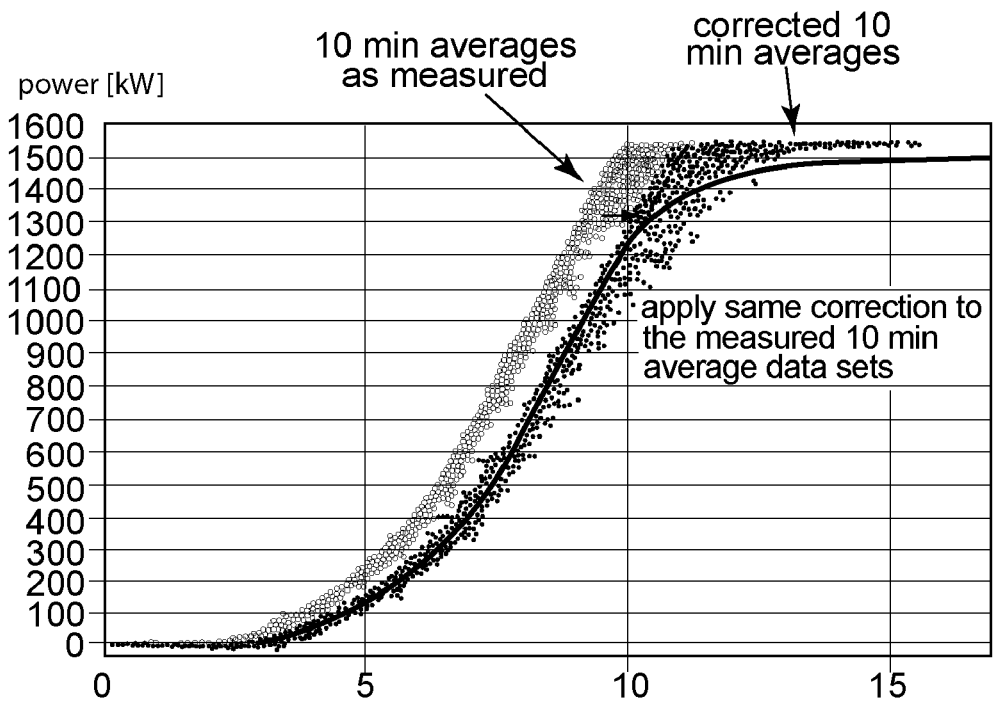
FIG. 10 shows the result of the correction step shown in FIG. 9.

FIG. 10 shows the result of the correction step shown in FIG. 9. Therein, the measured data have also been shifted according to the shift of the regression curve for the measured values. Apparently, they now fit closely with the expected power curve at least up to wind speeds of about 10 m/s. Since the shifted data correspond to anemometer measurements based on a corrected calibration curve, FIG. 10 illustrates the result of recalibrating the anemometer on the basis of the determined difference between the regression curves.

Figure 11:
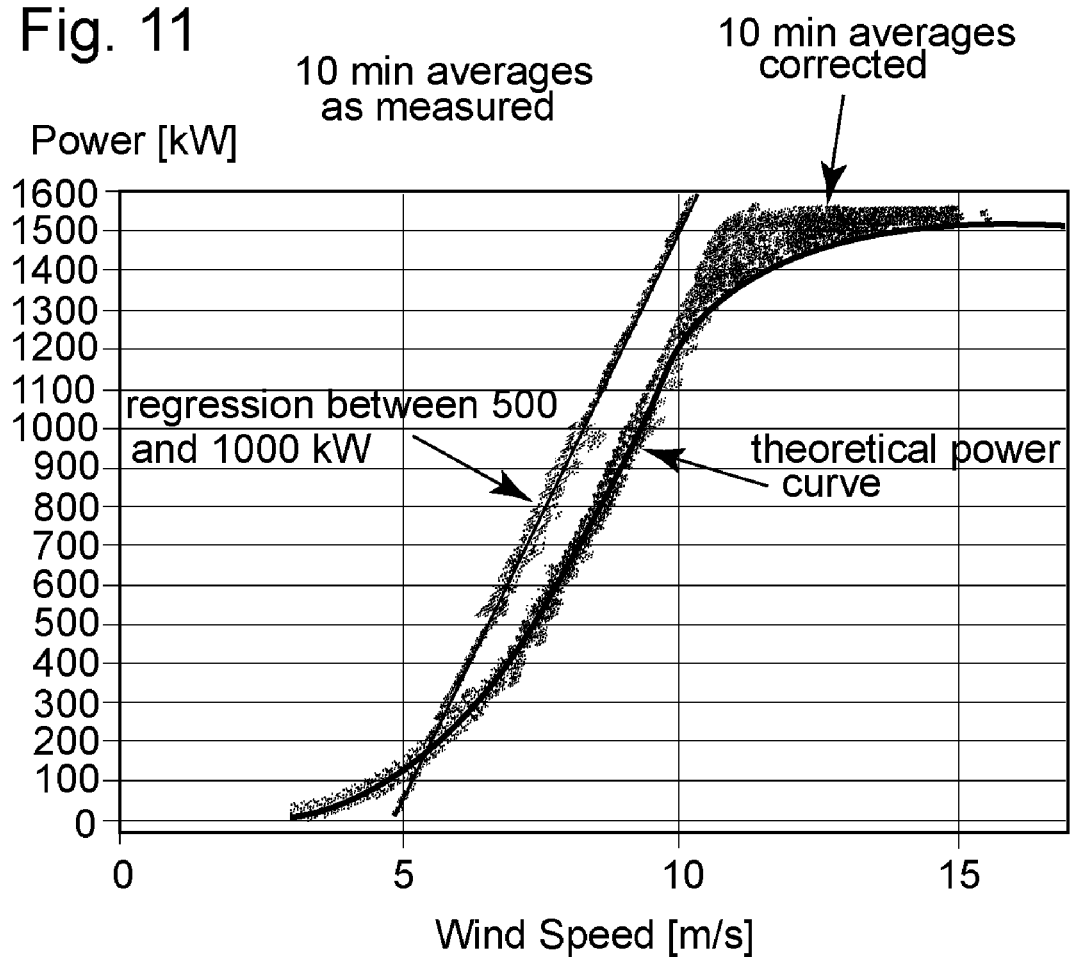
FIG. 11 shows the result of an anemometer calibration according to another embodiment of the present invention.

FIG. 11 clarifies another advantage of anemometer calibration methods according to embodiments of the present invention. Therein, it is demonstrated that a linear regression based on a rather small but linear part of the power curve between 500 kW and 1,000 kW is sufficient to obtain a rather satisfying result for the complete power range. Only within the uppermost 10 to 15% of the power curve, a considerable deviation of between the expected curve and the measured data still exists. However, such differences may also be reduced by applying more advanced methods for determining the expected power curve, e.g. dynamical adaptation of the expected power curve to the local environmental conditions.

Finally, it should be understood by those skilled in the art that the above-described methods for calibrating and/or recalibrating wind turbine anemometers may not only be performed one time after commissioning of the turbine but may repeated in regular intervals and/or at request of an operator.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for re-calibrating an anemometer of a wind turbine, comprising the steps of:
    obtaining pairs of measured values of wind speed and a wind speed-dependent turbine variable;
    comparing said pairs of measured values to pairs of values of wind speed and the turbine variable obtained from an expected turbine variable curve of the wind turbine to determine a difference between a measured wind speed value and an expected wind speed value for a given turbine variable value; and
    adjusting a calibration function of the anemometer on the basis of said determined difference.

2. The method according to claim 1, wherein the turbine variable is selected from the group consisting of: output power of a generator of the wind turbine, rotational speed of a wind rotor of the wind turbine, rotational speed of a rotor of the generator, torque of a rotor blade of the wind turbine, pitch angle of the rotor blade of the wind turbine, bending of the rotor blade of the wind turbine, vibrations of a tower of the wind turbine, vibrations of the rotor blade of the wind turbine, vibrations of a nacelle of the wind turbine, vibrations of a drive train of the wind turbine, and noise emissions from the wind turbine.

3. The method according to claim 1, wherein the pairs are selected from a substantially linear range of the expected turbine variable curve of the wind turbine.

4. The method according to claim 1, wherein the turbine variable is output power of a generator of the wind turbine, and the pairs are selected from a range from 1/3 to 2/3 of the nominal power of the wind turbine.

5. The method according to claim 1, wherein the turbine variable is output power of a generator of the wind turbine, and the pairs are selected from a range of power values between 400 kW to 1100 kW.

6. The method according to claim 1, wherein the pairs are selected from a range of wind speed values between 6 m/s to 12 m/s.

7. The method according to claim 1, wherein the measured values are time-averaged values which have been averaged over a measurement time of at least 30 seconds.

8. The method according to claim 1, wherein the measured values of wind speed are corrected for local air density at a site of the wind turbine.

9. The method according to claim 1, wherein the expected turbine variable curve is corrected for local air density at a site of the wind turbine.

10. The method according to claim 1, wherein the comparing step comprises obtaining wind speed as a function of the turbine variable.

11. The method according to claim 10, wherein wind speed is obtained as a function of output power of a generator of the wind turbine for the measured value pairs and the expected value pairs.

12. The method according to claim 10, wherein wind speed is obtained as a function of the turbine variable by linear regression of wind speed over the turbine variable.

13. The method according to claim 1, wherein the comparing step comprises binning the wind speed values with respect to the turbine variable and averaging within each bin to use the averaged values for comparison.

14. The method according to claim 13, wherein the number of wind speed values within each bin is at least equal to the number of turbine variable bins.

15. The method according to claim 1, wherein the re-calibration of the anemometer is repeated in regular intervals or at a request of an operator.

16. An in situ calibration method for an anemometer of a wind turbine, comprising the steps of:
  measuring wind speed and power of the wind turbine;
  performing regression analysis using the measured wind speed as a dependent variable and the measured power as an independent variable;
  performing the same regression analysis to an expected power curve using wind speed as a dependent variable and power as an independent variable;
  calculating a difference between measured wind speed and expected wind speed front the regression parameters; and
  adjusting a calibration function of the anemometer by means of the calculated difference so that an adjusted measured wind speed value fits with an expected wind speed value for a given power value.

17. The method according to claim 16, wherein the regression analysis is linear regression.

18. The method according to claim 16, wherein the measured wind speed and measured power values used for regression analysis are selected from a range from 1/3 to 2/3 of the nominal power of the wind turbine.

19. The method according to claim 16, wherein the measured wind speed values are binned with respect to power, are averaged within each bin, and the averaged values are used for the regression analysis.

20. A wind turbine comprising
  an anemometer for measuring wind speed values;
  a sensor for determining a wind speed-dependent turbine variable of the wind turbine; and
  a controller adapted to:
    obtain pairs of measured values of wind speed and the turbine variable;
    compare said pairs of measured values to pairs of values of wind speed and the turbine variable obtained from an expected turbine variable curve of the wind turbine to determine a difference between a measured wind speed value and an expected wind speed value for a given turbine variable value; and
    adjust a calibration function of the anemometer on the basis of said determined difference.

* * * * *

UNITED STATES PATENT AND TRADEMARK OFFICE
CERTIFICATE OF CORRECTION

PATENT NO. : 7,823,437 B2  Page 1 of 1
APPLICATION NO. : 11/764641
DATED : November 2, 2010
INVENTOR(S) : Siebers et al.

It is certified that error appears in the above-identified patent and that said Letters Patent is hereby corrected as shown below:

In Column 10, Line 17, in Claim 16, delete "front" and insert -- from --, therefor.

Signed and Sealed this
First Day of March, 2011

David J. Kappos
*Director of the United States Patent and Trademark Office*